(12) United States Patent
Wang et al.

(10) Patent No.: US 10,050,702 B1
(45) Date of Patent: Aug. 14, 2018

(54) REAL-TIME RAMAN GAIN MONITORING

(71) Applicant: Juniper Networks, Inc., Sunnyvale, CA (US)

(72) Inventors: Qiang Wang, Union City, CA (US); Yang Yue, Milpitas, CA (US); Bo Zhang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/698,001

(22) Filed: Sep. 7, 2017

Related U.S. Application Data

(62) Division of application No. 14/869,359, filed on Sep. 29, 2015, now Pat. No. 9,762,319.

(51) Int. Cl.
*H04B 10/077* (2013.01)
*H04B 10/073* (2013.01)

(52) U.S. Cl.
CPC ..... *H04B 10/0777* (2013.01); *H04B 10/0731* (2013.01); *H04B 10/0775* (2013.01)

(58) Field of Classification Search
CPC ............ H04B 10/0777; H04B 10/0775; H04B 10/0731
See application file for complete search history.

(56) References Cited

U.S. PATENT DOCUMENTS

| | | | | |
|---|---|---|---|---|
| 5,598,289 A | * | 1/1997 | Watanabe | H04B 10/071 359/334 |
| 6,188,508 B1 | * | 2/2001 | Horiuchi | H04B 10/0775 359/334 |
| 6,452,716 B1 | * | 9/2002 | Park | H04B 10/2916 359/334 |
| 6,587,260 B2 | * | 7/2003 | Kikuchi | H04B 10/291 359/334 |
| 6,611,368 B1 | * | 8/2003 | Grant | H04B 10/2916 359/334 |
| 6,611,370 B2 | * | 8/2003 | Namiki | H01S 3/302 359/334 |
| 6,704,135 B2 | * | 3/2004 | Sasaoka | H01S 3/302 359/334 |

(Continued)

FOREIGN PATENT DOCUMENTS

EP 2538586 A1 12/2012

OTHER PUBLICATIONS

Agrawal, "Nonlinear Fiber Optics", 2nd edition, chapter 8, figure 8.1, Dec. 2008, p. 318.

(Continued)

*Primary Examiner* — Danny Leung
(74) *Attorney, Agent, or Firm* — Shumaker & Sieffert, P.A.

(57) ABSTRACT

Techniques are described for determining, with a first optical node, a correction factor indicative of an amount of optical power loss that a Raman amplifier in a second optical node causes in an optical signal having a first wavelength that is transmitted by the first optical node and received by the second optical node, transmitting, with the first optical node to the second optical node, information, based on the determined correction factor, that is to be used for determining a gain of the Raman amplifier, and transmitting, with the first optical node to the second optical node, an optical signal having a second wavelength that is to be amplified by the Raman amplifier.

10 Claims, 11 Drawing Sheets

(56) References Cited

U.S. PATENT DOCUMENTS

| | | | | |
|---|---|---|---|---|
| 6,807,001 | B1* | 10/2004 | Ranka | H01S 3/1312 359/334 |
| 7,061,665 | B2* | 6/2006 | Sobe | G01M 11/319 359/334 |
| 8,643,941 | B2* | 2/2014 | Ghera | H04B 10/2942 359/334 |
| 8,681,419 | B2* | 3/2014 | Onaka | H01S 3/06754 359/334 |
| 9,762,319 | B1* | 9/2017 | Wang | H04B 10/0777 |
| 2003/0011874 | A1* | 1/2003 | Nakamoto | H01S 3/302 359/334 |
| 2003/0095322 | A1* | 5/2003 | Gehlot | H04B 10/0779 359/334 |
| 2004/0080812 | A1* | 4/2004 | Sugaya | H04B 10/0775 359/334 |
| 2005/0024712 | A1* | 2/2005 | Hiraizumi | H01S 3/06754 359/334 |
| 2006/0269287 | A1* | 11/2006 | Bidmead | H04B 10/0775 398/130 |
| 2009/0109523 | A1* | 4/2009 | Lichtman | H04B 10/2916 359/334 |
| 2014/0072306 | A1* | 3/2014 | Sridhar | H04J 14/0275 398/79 |

OTHER PUBLICATIONS

Bromage, "Raman Amplification for Fiber Communications Systems," Journal of Lightwave Technology, vol. 22, No. 1, Jan. 2004, pp. 79-93.

Chang et al., "Automatic gain control in Raman amplifier with multi-wavelength pumps," Science Direct, vol. 266, No. 2, Oct. 15, 2006, pp. 521-526.

Emori et al., "Independent Control of the Gain and Noise Figure Spectra of Raman Amplifiers Using Bi-Directional Pumping," Furukawa Review, No. 23, Apr. 2003, pp. 11-15.

Oliviera et al., "Hybrid Distributed Raman/EDFA Amplifier with Hybrid Automatic Gain Control for Reconfigurable WDM Optical Networks," Journal of Microwaves, Optoelectronics and Electromagnetic Applications, vol. 12, No. 2, Dec. 2013, pp. 602-616.

Pelouch, "Raman Amplification: an Enabling Technology for High-Capacity, Long-Haul Transmission," Xtera Communications, Inc., Jan. 6, 2015, 30 pp.

"White Paper: Operational Issues in the Deployment of Raman Amplifiers," Finisar Corporation, Nov. 2012, 5 pp.

Prosecution History from U.S. Appl. No. 14/869,359, dated from Sep. 15, 2016 through May 18, 2017, 32 pp.

* cited by examiner

REAL-TIME RAMAN GAIN MONITORING

This application is a divisional of U.S. application Ser. No. 14/869,359, filed Sep. 29, 2015, the entire contents of which is hereby incorporated by reference.

TECHNICAL FIELD

This disclosure relates to optical communication, and more particularly, to long-haul optical communication systems.

BACKGROUND

Optical communication systems include optical amplifiers to amplify optical signals as the optical signals flow through the system. As one example, Raman amplifiers are located in optical nodes that are separated by approximately 80-100 km in the optical communication system. Raman amplifiers provide optical gain (amplification) arising from stimulated Raman scattering. For example, Raman amplifiers include a plurality of Raman pumps that each output an optical signal at different wavelengths, and the combination of the optical signals from the Raman pumps adds to the received optical signal to provide distributed amplification on the optical signal that is received. There may be loss in the optical signal transmitted by a first optical node to the second optical node, and the Raman amplifier in the second optical node amplifies the optical signal that the second optical node receives to compensate for the loss.

SUMMARY

The amount of optical gain that a Raman amplifier should apply is susceptible to changes in point loss and span loss, and therefore, an optical node that includes a Raman amplifier is configured to determine the Raman amplifier gain in real-time. To assist in determining the Raman amplifier gain for a Raman amplifier, a previous optical node (e.g., the optical node that transmits the optical signal that is received by the current optical node that includes the Raman amplifier whose gain is being set) outputs information that allows the current optical node having the Raman amplifier to determine optical power loss in the transmitted optical signal. However, techniques to determine the optical power loss may not be accurate due to effects from optical signals outputted by the previous optical node on Raman pumps of the Raman amplifier in the current optical node.

In examples in accordance with this disclosure, the previous optical node turns on and off an out-of-band laser (e.g., a laser that outputs optical signals having an out-of-band wavelength) and determines the effects of the optical signal having the out-of-band wavelength on the Raman pumps of the Raman amplifier. The out-of-band laser experiences extra power loss due to energy transfer to Raman pump from current node, which leads to inaccuracy in measurement of Raman gain for current node. The previous optical node determines a correction factor indicative of an amount of optical power loss that a Raman amplifier in the current optical node causes in the optical signal that is transmitted by the previous optical node. Based on the correction factor, the current optical node may more accurately determine the optical power loss, and with the determined optical power loss, the current optical node may set its Raman amplifier gain to compensate for the optical power loss.

In one example, the disclosure describes a method comprising determining, with a first optical node, a correction factor indicative of an amount of optical power loss that a Raman amplifier in a second optical node causes in an optical signal having a first wavelength that is transmitted by the first optical node and received by the second optical node. The method includes transmitting, with the first optical node to the second optical node, information, based on the determined correction factor, that is to be used for determining a gain of the Raman amplifier, and transmitting, with the first optical node to the second optical node, an optical signal having a second wavelength that is to be amplified by the Raman amplifier.

In one example, the disclosure describes an optical node comprising a laser and a processor. The processor is configured to determine a correction factor indicative of an amount of optical power loss that a Raman amplifier in a following optical node causes in an optical signal having a first wavelength that is transmitted by the optical node and received by the following optical node, and cause the laser to transmit information to the following optical node, the information being based on the determined correction factor and to be used for determining a gain of the Raman amplifier. The optical node is configured to transmit to the following optical node an optical signal having a second wavelength that is to be amplified by the Raman amplifier.

In one example, the disclosure describes an optical node comprising a Raman amplifier configured to amplify an optical signal having a second wavelength, a photodiode, and a processor. The processor is configured to determine an amount of current generated by the photodiode that receives, from a previous optical node, an optical signal having a first wavelength, receive information based on a correction factor, the correction factor is indicative of an amount of optical power loss that the Raman amplifier causes in the optical signal having the first wavelength that is transmitted by the previous optical node, determine the Raman amplifier gain for optical signals having the second wavelength based on the determined amount of current generated by the photodiode and the received information, and set the Raman amplifier gain of the Raman amplifier for the Raman amplifier to amplify the optical signal having the second wavelength.

In one example, the disclosure describes a method comprising determining, with an optical node, an amount of current generated by a photodiode that receives an optical signal having a first wavelength that is transmitted by a previous optical node, receiving, with the optical node, information based on a correction factor, the correction factor is indicative of an amount of optical power loss that a Raman amplifier causes in the optical signal having the first wavelength that is transmitted by the previous optical node, and determining, with the optical node, a Raman amplifier gain of a Raman amplifier for optical signals having a second wavelength based on the determined amount of current generated by the photodiode and the received information. The method includes setting, with the optical node, the Raman amplifier gain of the Raman amplifier based on the determined Raman amplifier gain, and amplifying, with the optical node, the optical signals having the second wavelength with the Raman amplifier.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
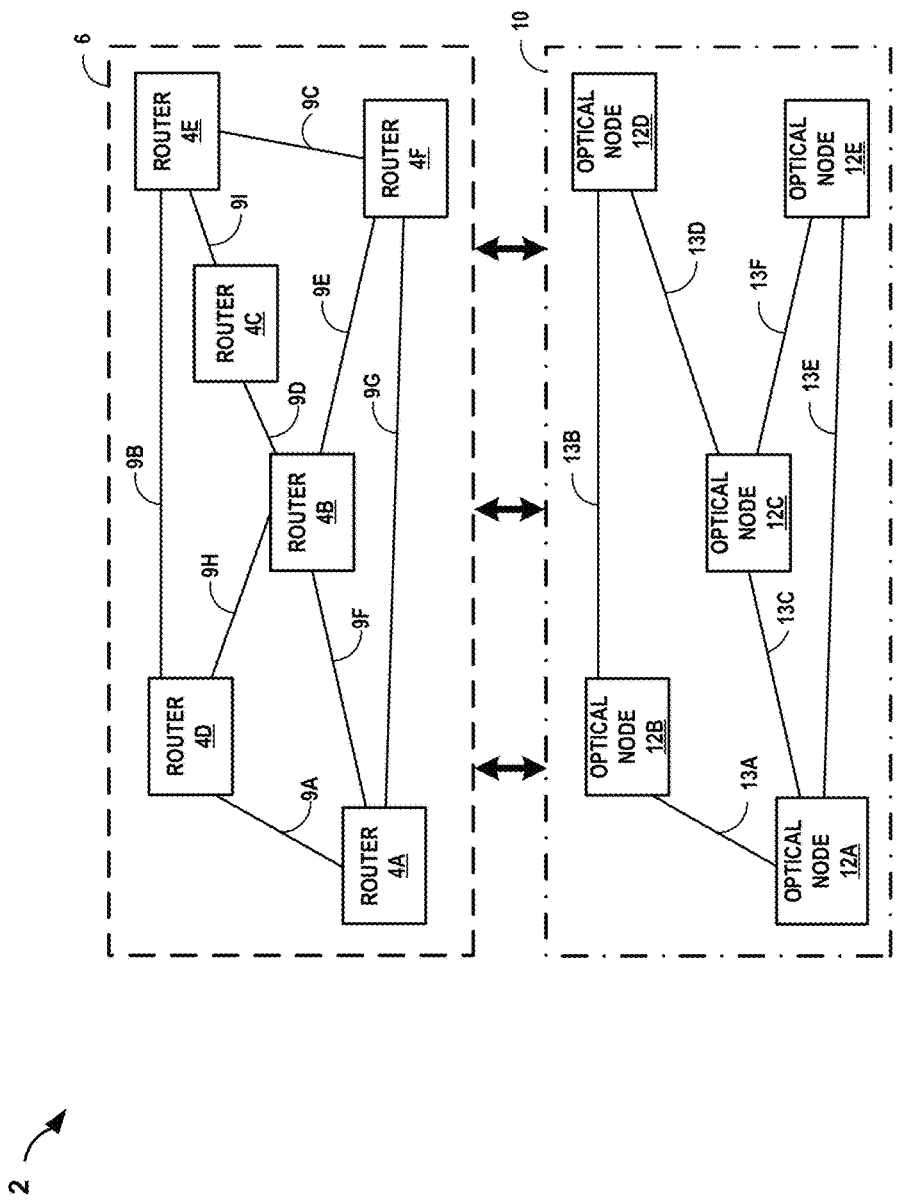
FIG. 1 is a block diagram illustrating a communication system in accordance with one or more examples described in this disclosure.

FIG. 1 is a block diagram illustrating a communication system in accordance with one or more examples described in this disclosure. Communication system 2 may represent an example instance of any of the various network systems, with optical communication system 10, illustrated in further detail in FIG. 2, to include optical nodes 12A-12E (collectively, "optical nodes 12") interconnected by optical links 13A-13F (collectively, "optical links 13"). In the illustrated example, each of optical nodes 12 is associated with one of routers 4 of network 6. For example, optical nodes 12 may couple to respective routers 4 via grey optics, in which a router exchanges grey (uncolored) optical signals with a transponder that converts between a grey optical signal and an optical signal at a specific wavelength (color) exchanged with a WDM (wavelength-division multiplexing) device. In some examples, one or more pairs of optical nodes 12 and routers 4 may be integrated (e.g., a router having integrated transponders for converting between optical and electrical signals and an integrated optical cross connect (OXC) or WDM device). As one example, optical nodes 12 may be formed on linecards that are included in routers 4. In some examples, one or more optical nodes 12 do not include an interface with any of routers 4. Such optical nodes may represent OXCs that switch lambdas for optical paths.

In some examples, communication system 2 may include any combination of any of the following architectural models: (1) optical transport network (OTN) layer added to network layer 6 (bypass model); (2) optimized hybrid MPLS+OTN topology; (3) MPLS-only packet transport network; and (4) OTN-only circuit transport network.

Each of optical nodes 12 may represent a PCX, WDM/DWDM device, TDM-based devices, OXCs, OADMs, ROADMs, multiplexing devices, or other types of devices or other devices that transmit, switch and/or multiplex optical signals. A topology provisioning module and/or an administrator of optical communication 10 configures optical nodes 12 to switch optical signals along optical paths, each optical path beginning at an optical transmitter and terminating at an optical receiver and each of the optical transmitter and optical receiver being associated with a different one of optical nodes 12 that includes an interface to one of routers 4. In this way, routers 4 may exchange packets via optical paths. An optical path may alternatively be referred to as an optical path, a light path, a lambda, or an optical transport network wavelength. Example bandwidths for an optical path may include (e.g., 2.5 Gbps, 10 Gbps, 40 Gbps, 100 Gbps, or 400 Gbps).

Each of optical nodes 12 and optical links 13 exhibits characteristics that affect the optical signal received at an optical receiver for an optical path that includes such optical nodes 12 and optical links 13. In other words, the optical signal received at the receiver may be affected by impairments including transmission and optical switching characteristics of the optical equipment and therefore differs from the optical signal transmitted at the optical transmitter.

In FIG. 1, system 2 includes logical network 6 in addition to optical communication system 10. Network 6 includes routers 4A-4F (collectively "routers 4") to control switching and routing of packet flows. Network 6 may represent an Internet Protocol (IP) network. Examples of routers 4 include layer 3 (L3) routers and layer 2 (L2) switches or L2/L3 switches that collectively provide network 6. That is, network 6 typically provides L2/L3 traffic forwarding services, such as traffic engineering via Multiprotocol Label Switching traffic-engineered (MPLS-TE) including label switched paths (LSPs), Virtual Local Area Network (VLANs), and so forth. Various examples of network 6 may encompass many hundreds or even thousands of routers/switches.

Underlying optical communication system 10 transports, multiplexes, and switches packet-based communications through high-speed optical links 13. As illustrated, optical communication system 10 may include multiple optical nodes 12 (e.g., optical communication devices such as packet-optical transport devices) interconnected via optical links 13 and controlling transmission of optical signals carrying packet data along the optical links 13. In this way, optical communication system 10 provides a physical layer that physically interconnects routers 4 of network 6.

Logical network 6 is in effect an overlay network "built on top of" underlying optical communication system 10. Routers 4 are connected by virtual or logical links (an example topology for which is illustrated in FIG. 1 with links 9A-9I (collectively "links 9")), each of which corresponds to a path in the underlying optical communication system 10.

As illustrated and explained above with respect to FIG. 1, optical communication system 10 includes optical node 12A and optical node 12B coupled to one another via optical link 13A, and examples of optical communication system 10 include, but are not limited to, WDM systems, including a dense wavelength-division multiplexing (DWDM) systems. As one example, optical communication system 10 is a long-haul DWDM system operating polarization-division quadrature phase shift keying (PM-QPSK) at 100 giga-bits per second (Gbps). However, the techniques described in this disclosure are not limited to WDM or PM-QPSK systems. The techniques are extendable to other optical communication systems. For purposes of illustration only and for ease of description, the examples are described in context of a WDM system.

Also, for ease of description, the examples are described with respect to optical node 12A and optical node 12B, but the example techniques are applicable to the other optical nodes 12 as well. In the example illustrated in FIG. 1, optical node 12A and optical node 12B are configured to amplify received signals and transmit the amplified optical signals. For example, in long-haul optical signals, the distance between optical node 12A and optical node 12B may be in the order of 80 kilometers (km) to 120 km (e.g., optical link 13A is 80 km to 120 km). The optical signals that optical node 12A transmits attenuate such that optical power of the optical signals at the instant the optical signals output from optical node 12A are less than the optical power of the optical signals at the instant that optical node 12B receives the optical signals. If the optical signals are not amplified, the attenuation may be of sufficient degree for the receiving device to not be able to resolve the digital bits of the optical signal.

Optical nodes 12A and 12B, and similar optical nodes, may be a placed every 80 km to 120 km, or even greater distances, in the long-haul optical communication system 10 so that the optical signal from a transmitting device (e.g., the data transmission source such as a data communication server) is periodically amplified. In this way, when the optical signal is received by the receiving device (e.g., a home computer), the amplitude of the optical signal is high enough for the receiving device to determine the difference between digital ones and digital zeros in the optical signals.

There may be various causes of optical power loss on optical link 13A. One example reasons is due to point loss, another example reason is due to span loss, and additional reasons for loss may be possible. Span loss is mainly caused by attenuation and scattering in the fiber attenuation due to impurity in glass material. Also connector loss and splicing loss contribute to span loss.

Point loss refers to the loss in optical power of Raman pumps (described below) due to imperfections at physical interconnects. For example, there may be some optical connectors, cables, splicing points in between optical link 13A termination point and the input of optical node 12B. A small change in point loss may lead to large Raman gain change.

As described in this disclosure, optical node 12B includes a Raman amplifier to amplify the optical signal outputted by optical node 12A. This disclosure describes example techniques for determining the amount of amplification (e.g., gain) that the Raman amplifier is to apply. For instance, as described in more detail below, optical node 12A determines a correction factor that is indicative of effects of an optical signal having an out-of-band wavelength (e.g., 1310 nm) on the Raman amplifier in optical node 12B. With the correction factor, optical node 12B may more accurately determine the optical power loss for optical signals having a communication signal wavelength (e.g., 1550 nm), and determine the gain of the Raman amplifier based on the determined optical power loss.

Figure 2:
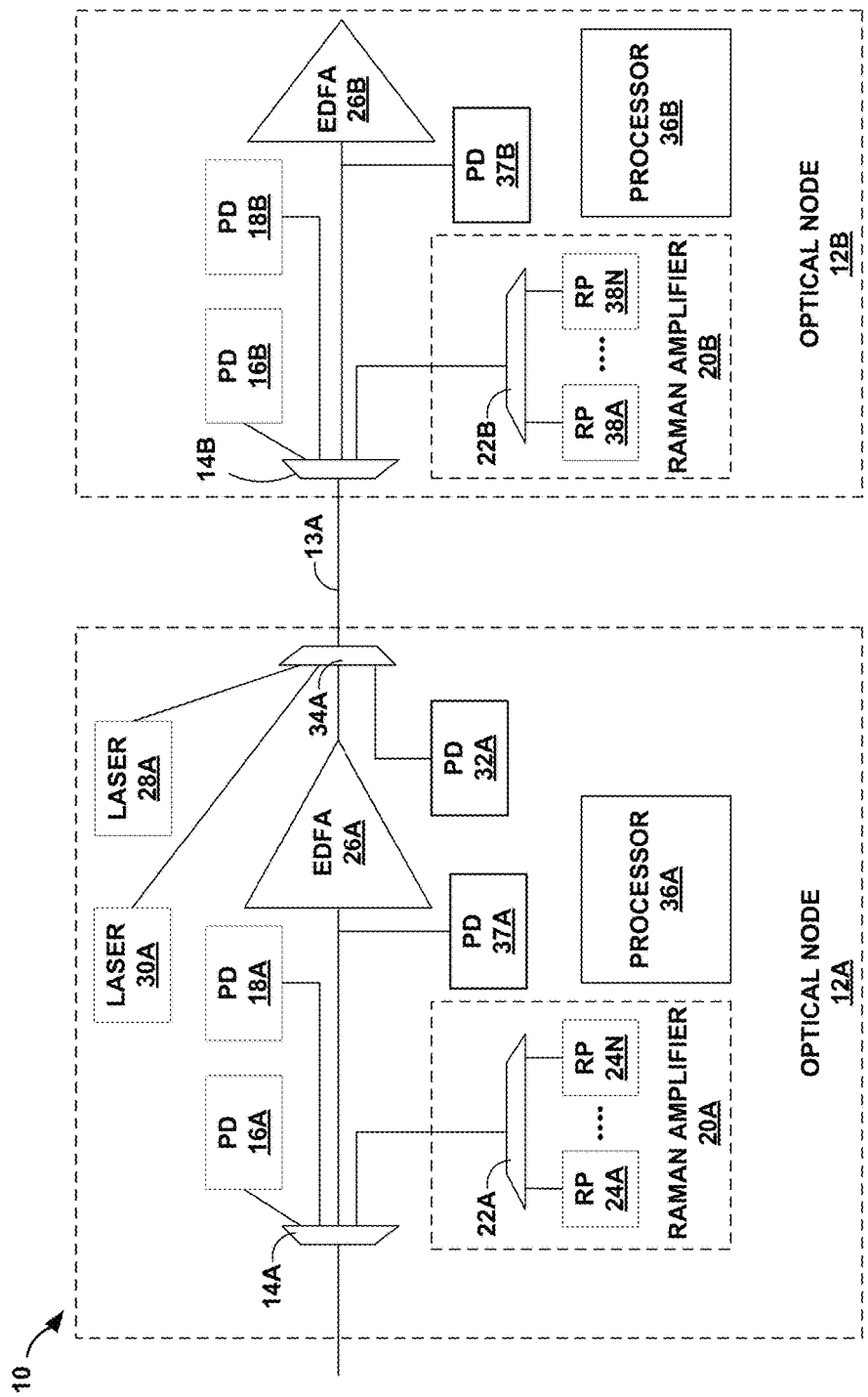
FIG. 2 is a block diagram illustrating optical nodes of the optical communication system portion of the communication system of FIG. 1 in more detail.

FIG. 2 is a block diagram illustrating optical nodes 12A and 12B of optical communication system 10 of communication system 2 of FIG. 1 in more detail. Optical node 12A includes WDM 14A, photodiode (PD) 16A, PD 18A, Raman amplifier 20A, Erbium Doped Fiber Amplifier (EDFA) 26A, laser 28A, laser 30A, PD 32A, WDM 34A, and processor 36A, and PD 37A (for measuring input power to EDFA 26A). Raman amplifier 20A includes a plurality of Raman pumps (RPs) 24A-24N (collectively referred to as "RPs 24") and pump combiner 22A. Examples of processor 36A include, but are not limited to, a digital signal processor (DSP), a general purpose microprocessor, an application specific integrated circuit (ASIC), a field programmable logic array (FPGA), a combination thereof, or other equivalent integrated or discrete logic circuitry.

WDM 14A and WDM 34A may be splitter/combiners. For example, WDM 14A receives an optical signal that includes a plurality of optical signals each having a different wavelength. WDM 14A splits the optical signals and transmits them to different components (e.g., PD 16A, PD 18A, and EDFA 26A). For example, PD 16A may receive an optical signal having a first wavelength (e.g., 1310 nm), and EDFA 26A may receive an optical signal having a second wavelength (e.g., 1550 nm). WDM 14A and WDM 34A may be passive bi-direction devices, and PD 32A may receive an optical signal having a third wavelength (e.g., between 1415 nm to 1475 nm, referred to as 14xx nm), as described in more detail, that is reversely transmitted through fiber link 13A to optical node 12A. PD 18A may receive an optical signal having a fourth wavelength (e.g., 1510 nm).

WDM 34A receives optical signals having different wavelengths from laser 30A (at first wavelength), EDFA 26A (at second wavelength), and laser 28A (at fourth wavelength), respectively. WDM 34A combines the optical signals together that are transmitted from optical node 12A to optical node 12B. WDM 34A also allows PD 32A to receive optical signal reversely propagating from node 12B to 12A at the third wavelength.

Optical node 12B includes similar, corresponding components as optical node 12A. For ease of illustration, WDM 14B, PD 16B, PD 18B, Raman amplifier 20B, EDFA 26B, PD 37B, and processor 36B of optical node 12B are illustrated, but optical node 12B includes additional components, such as those of optical node 12A, that are not illustrated.

For ease of description, in this disclosure, the functionality of a component in optical node 12A should be assumed to be same as that of a corresponding component of optical node 12B. For example, like WDM 14A, WDM 14B receives an optical signal carrying optical signals at different wavelengths (sometimes referred to as channels). WDM 34A of optical node 12A receives an optical signal having a wavelength of in the O-band from laser 28A (the first wavelength), an optical signal having a wavelength in the communication band from EDFA 26A (the second wavelength) and an optical supervisory channel (OSC) optical signal from laser 30A (the fourth wavelength). The wavelength range of the O-band is 1270 nm to 1340 nm (e.g., 1310 nm), the wavelength range of the communication band is 1530 nm to 1610 nm (e.g., 1550 nm), and the wavelength of the OSC signal is 1510 nm. The above wavelengths are provided merely as an example, and other wavelengths are possible as well. As described above, WDM 34A combines these optical signals and transmits these optical signals having the different wavelengths as a single optical signal on optical link 13A.

The output of EDFA 26A is the communication signal that carries the actual data content. The OSC channel is used to communicate between optical nodes 12A and 12B, where information about out-of-band signal can be transmitted. The O-band laser is used for assisting with determining the Raman amplifier gain, as described in more detail. To amplify the communication signal, Raman amplifier 20B outputs a reverse optical signal on optical link 13A via WDM 14B, and optical link 13A itself functions as a gain medium for the optical signal that optical node 12A transmits.

Raman amplifier 20B includes Raman pumps 38A-38N (collectively referred to as Raman pumps 38), and each of the Raman pumps outputs an optical signal having a wavelength between 1420 nm to 1480 nm, as merely one example, where each one of Raman pumps 38A-38N has a different wavelength. Raman pumps 38A-38N may be considered as having a wavelength of 14xx nm (the third wavelength). Pump combiner 22B combines the optical signals from Raman pumps 38 and WDM 14B transmits the output of Raman amplifier 20B via optical link 13A.

Because optical nodes 12A and 12B each include an EDFA and a Raman amplifier, optical nodes 12A and 12B provide hybrid amplifying (e.g., both EDFAs and Raman amplifiers 20A and 20B amplify optical signals). However, EDFAs may not be necessary in every example. In some examples, optical nodes 12A and 12B may include only Raman amplifiers 20A and 20B, respectively, for amplifying, and may not include EDFAs.

Using Raman amplifiers like Raman amplifiers 20A and 20B are useful because they function directly on the optical signal without needing any conversion of the optical signal to an electrical signal for amplification and then reconversion to an optical signal. Other optical amplifiers like EDFA 26A exist that amplify the optical signal without needing conversion to an electrical signal. However, Raman amplifier 20B provides certain advantages over EDFAs.

For Raman amplification, optical link 13A itself becomes the gain medium, rather than requiring a separate gain medium. For instance, the optical signal that Raman pumps 38 output interact with the optical signal that optical node 12A outputs to provide gain. The amount of gain that Raman amplifier 20B provides is based on the amplitude of the optical signals outputted by Raman pumps 38. This way the optical signal traveling along optical link 13A is amplified in a distributed manner as the optical signal travels through optical link 13A. Raman amplification also provides enough gain with a smaller noise floor, which may not be available with just EDFAs, thus extend the distance of optical signal before that it is forced to be regenerated in electrical domain.

The following provides some more description of the functionality of Raman amplifier 20B. The description is provided merely to assist with understanding, and should not be considered as limiting the examples of Raman amplifier 20B.

Figure 3:
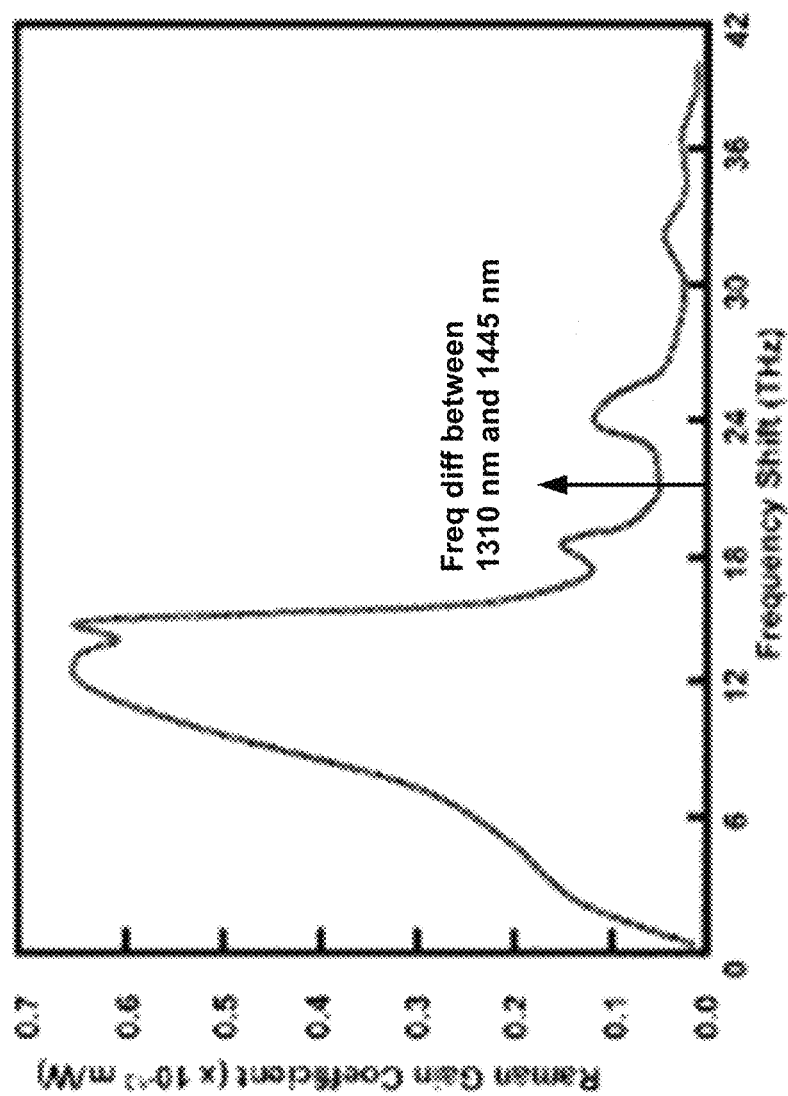
FIG. 3 is a graph illustrating Raman gain coefficients over a frequency shift.

FIG. 3 is a graph illustrating Raman gain coefficients over a frequency shift. For instance, FIG. 3 illustrates the Raman gain spectrum over a range of frequency of a single Raman pump. As shown in FIG. 3, a single Raman pump (e.g., Raman pump 38A) may apply gain across a wide range. For example, the single Raman pump may apply gain to optical signals over a wide range of wavelengths. Furthermore, the gain that the Raman pump applies is not the same over all of the optical signal wavelengths. Although FIG. 3 is illustrated with respect to frequency, the conversion of frequency to wavelength is: wavelength=(speed of light)/(frequency). For reasons described in more detail below, FIG. 3 illustrates the point indicating the frequency difference between 1310 nm wavelength and 1445 nm wavelength.

Figure 4:
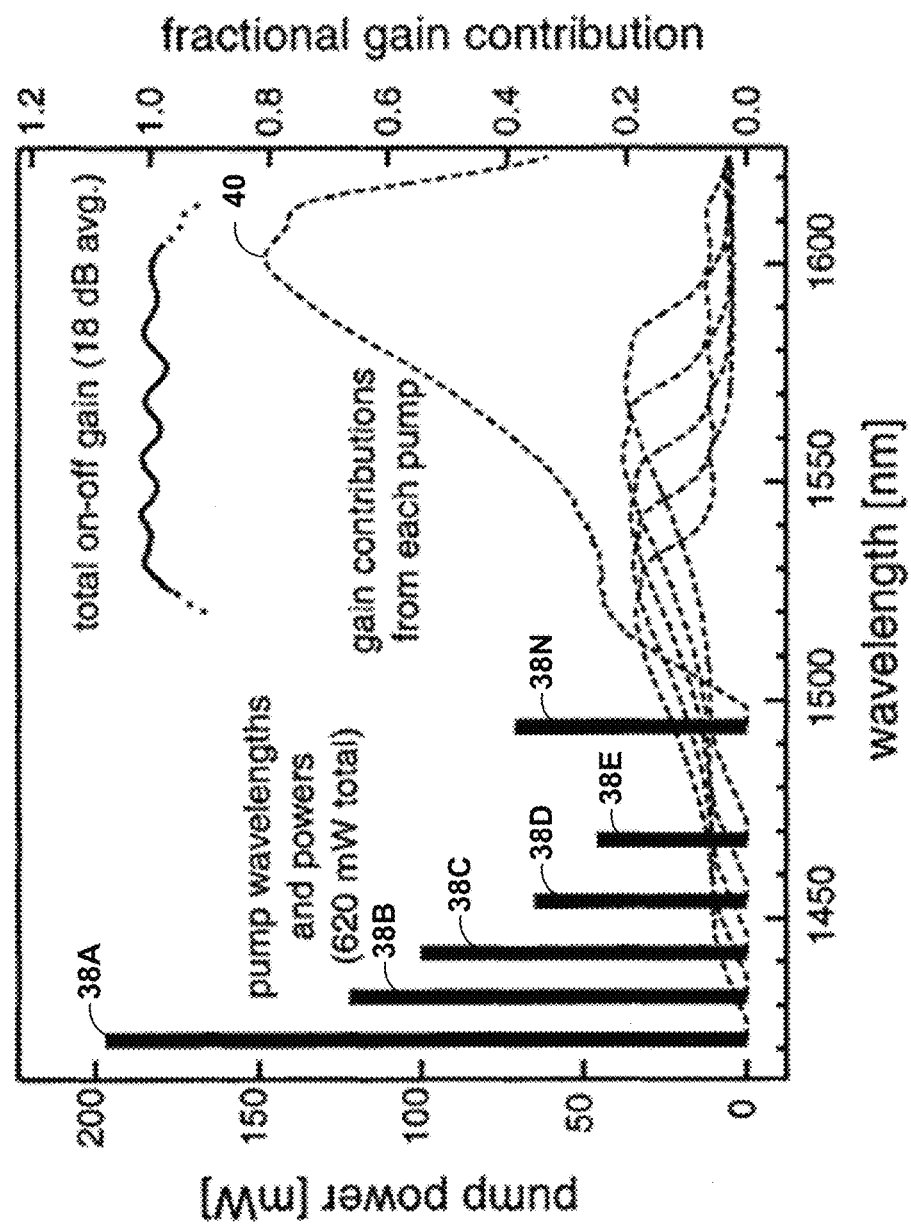
FIG. 4 is a graph illustrating Raman pump power and fractional contributions of Raman pumps at different wavelengths.

Because the gain that a single Raman pump applies is not the same over all optical signal wavelengths, Raman amplifier 20B includes a plurality of Raman pumps (e.g., Raman pumps 38A-38N), where the sum of the gain provided by Raman pumps 38 results in generally uniform gain across multiple (but not necessarily all) wavelengths. Each one of the Raman pumps 38 outputs at a slightly different wavelength. Accordingly, each of Raman pumps 38 may be considered as having a Raman gain spectrum similar to the illustrated example in FIG. 3, but slightly shifted. When the gain from each of Raman pumps 38 is combined, Raman amplifier 20B may provide uniform gain across multiple wavelengths. FIG. 4 illustrates this in more detail.

FIG. 4 is a graph illustrating Raman pump power and fractional contributions of Raman pumps at different wavelengths. In FIG. 4, the vertical bolded lines illustrate the pump power of the optical signals generated by respective Raman pumps 38A-38N. As can be seen, each of Raman pumps 38 outputs a different amount of optical power at a different wavelength. The dashed lines at the bottom illustrate the respective Raman gain spectrums of respective ones of Raman pumps 38A-38N. The x-axis of FIG. 4 is wavelength, which is why the curves appear more biased towards the right, whereas in FIG. 3, where the x-axis is frequency, the curve appeared more biased towards the left.

The dashed curve 40 illustrates the summation of the Raman gain spectrums of each one of Raman pumps 38. In this example, Raman amplifier 20B provides approximately 18 dB of gain on average. The shape of dashed curve 40 can be set by changing the optical power of the optical signals outputted by Raman pumps 38 and/or the wavelengths at which Raman pumps 38 output respective optical signals.

Figure 5:
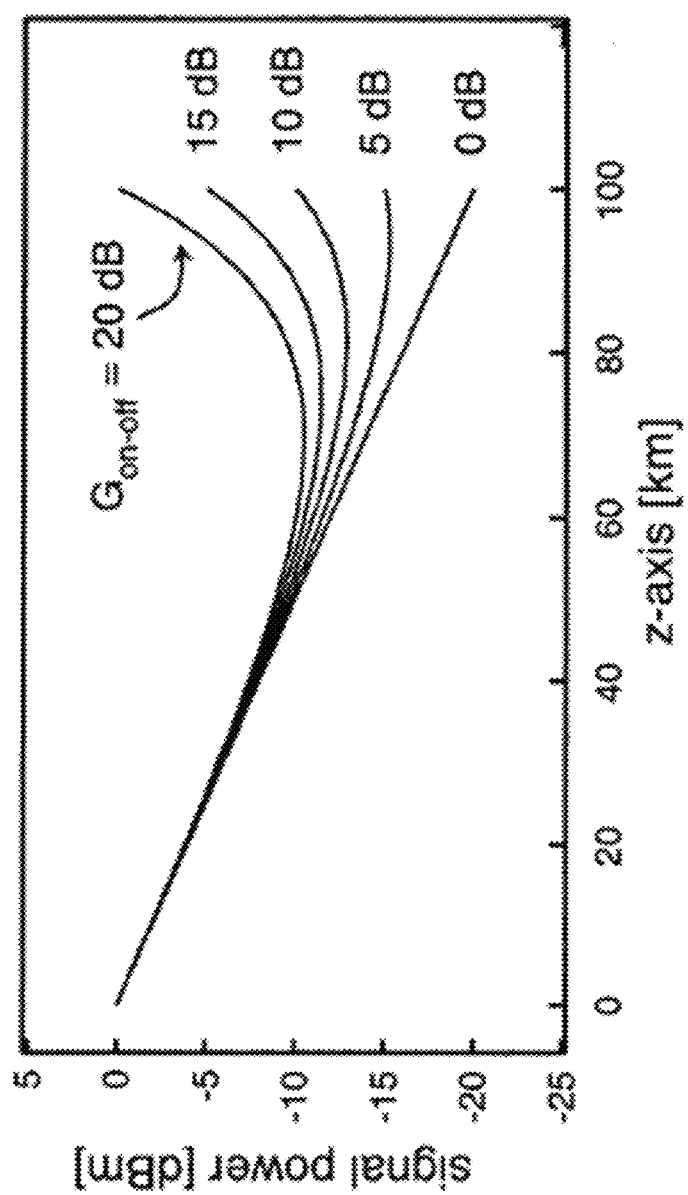
FIG. 5 is a graph illustrating optical power loss over distance and effects of Raman amplifier gain.

FIG. 5 is a graph illustrating optical power loss over distance and effects of Raman amplifier gain. The bottom axis in FIG. 5 represents the length of optical link 13A. As illustrated, a longer the distance of optical link 13A results in more optical power loss on optical link 13A. If there is no Raman amplifier gain, then after approximately 100 km, there is −20 dB optical power loss. With 5 dB of Raman amplifier gain by Raman amplifier 20B (e.g., $G_{on\text{-}off}$=5 dB), the optical power after 100 km is approximately −15 dB. With 10 dB of Raman amplifier gain by Raman amplifier 20B (e.g., $G_{on\text{-}off}$=10 dB), the optical power after 100 km is approximately −10 dB. With 15 dB of Raman amplifier gain by Raman amplifier 20B (e.g., $G_{on\text{-}off}$=15 dB), the optical power after 100 km is approximately −5 dB. With 20 dB of Raman amplifier gain by Raman amplifier 20B (e.g., $G_{on\text{-}off}$=20 dB), the optical power after 100 km is approximately 0 dB (e.g., no loss).

Accordingly, if processor 36B determines that there is approximately −20 dB of optical power loss from optical link 13A (e.g., via span loss and/or point loss or even other losses), processor 36B may set the outputs of Raman pumps 38 to set the gain of Raman amplifier 20B to be 20 dB (or possibly a greater or lesser value based on other factors such as loss of output at optical node 12). In this way, processor 36B may compensate for the loss in optical power on the optical link 13A. More generally, by amplifying the communication signal outputted by optical node 20A, components further downstream from optical node 20B are able to properly determine which bits are a digital one and which bits are a digital zero in the optical signal. Without the amplification, the digital ones and digital zeros would be at the noise floor, and distinguishing between the two would not have been possible.

While Raman amplification provides various benefits, there may be certain drawbacks. As one example, determining how much amplification (e.g., gain) Raman amplifier 20B is to provide may be complicated. For example, with Raman amplification 20B, the start point of the signal that is amplified (e.g., at optical node 12A) and the point at which amplification is applied (e.g., at optical node 12B) is separated by a large distance. Therefore, simultaneous access to the start of the optical signal and the point where gain is added, which would be useful for determining gain, is not available at the same time.

Such limitations result in difficulty in dynamically (e.g., in real-time) determining the gain that Raman amplifier 20B should provide. For instance, in real-time (e.g., during operation of when optical signal is being outputted by optical node 12A to optical node 12B), determining the gain of Raman amplifier 20B may be complicated because simultaneous access to both the input signal (the signal that is to be amplified) and output signal (the signal resulting from the amplification) is not available, unlike an EDFA where the input and output signals are both available (e.g., the input and output of EDFA 26A is simultaneously available for setting the gain of EDFA 26A).

This disclosure describes example techniques for real-time determination of the gain of Raman amplifier 20B (e.g., during operation where optical node 20A is outputting the communication signal that is to be amplified). To perform the real-time determination of the gain of Raman amplifier 20B, optical node 20A outputs information that processor 36B uses to determine the optical power loss on link 13A. Processor 36B then uses the determined optical power loss to determine the gain of Raman amplifier 20B.

In some examples, for processor 36B to directly determine the optical power loss of optical link 13A at the communication signal wavelength may require processor 36B to turn on and off Raman amplifier 20B. This is because Raman amplifier 20B is providing amplification to the optical signal and access to the instant when optical node 20A outputted the communication signal is not available. Therefore, the direct way to determine the optical loss of optical link 13A at the communication signal wavelength would be to turn off Raman amplifier 20B and determine the optical power of the communication signal, then turn on Raman amplifier 20B and determine the optical power of the communication signal, and then based on the Raman amplifier gain and the change in the optical power of the communication signal from when Raman amplifier 20B was turned on and off, processor 36B may determine the optical power loss on optical link 13A at the communication signal wavelength.

However, turning on and off Raman amplifier 20B to determine the optical power loss on optical link 13A may not be practical. For example, when Raman amplifier 20B is off, the communication signal that optical node 20A outputs is not being amplified. Therefore, components further downstream would not be able to resolve the digital ones and digital zeros, resulting in an undesirably high error rate. Another option would be to only send test data, rather than the actual data, initially via the communication signal during the time that processor 36B determines the optical power loss. This would result in a delay of when the actual data is received, which may also be undesirable.

In this disclosure, processor 36B may determine the optical power loss of optical link 13A at the communication signal wavelength in an indirect manner based on the optical power loss of optical link 13A at a different wavelength. Again, based on the optical power loss of optical link 13A at the communication signal wavelength, processor 36B may determine the Raman amplifier gain of Raman amplifier 20B (e.g., the optical power that each one of Raman pumps 38 is to output).

Figure 6:
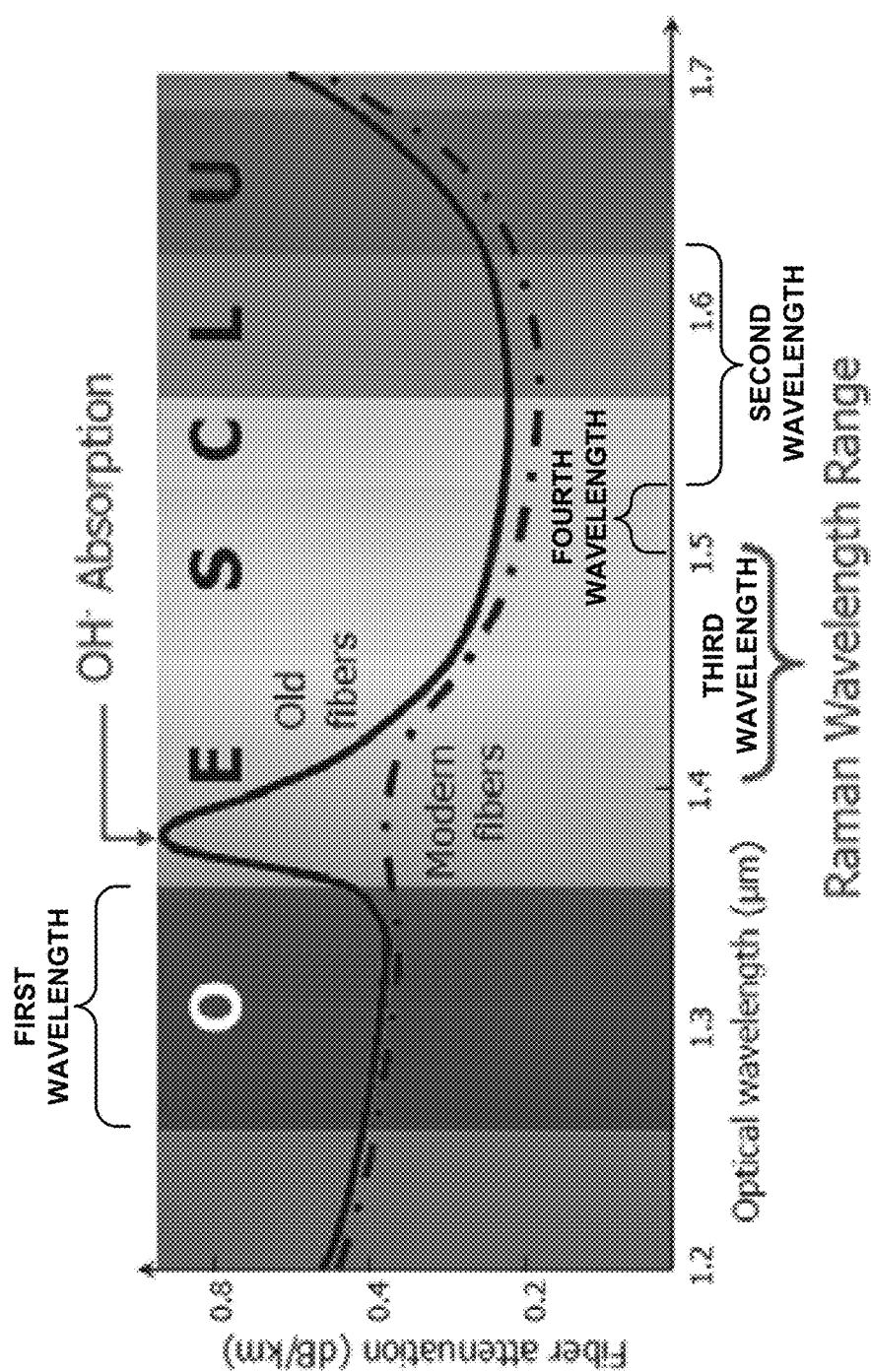
FIG. 6 is a graph illustrating optical power loss for different wavelengths in the optical fiber, where the four wavelength bands are also illustrated.

The amount of optical power loss on optical link 13A may be different for different wavelengths. FIG. 6 is a graph illustrating optical power loss for different wavelengths in the optical fiber, where the four wavelength bands are also illustrated.

As illustrated in FIG. 6, for old and modern fibers (e.g., optical links), the optical power loss at lower wavelengths (e.g., in the O-band) is greater than the optical power loss at higher wavelengths (e.g., in the C and L-bands), and then the optical power loss at higher wavelengths (e.g. U band) gets worse. Therefore, an optical signal having a wavelength in the O-band (e.g., 1310 nm) will experience different amount of optical power loss as compared to the communication signal having a wavelength of 1550 nm.

While the optical power loss on optical link 13A for optical signals having different wavelengths is different, there may be a set ratio of optical power loss between two particular wavelengths. For example, an optical signal having a wavelength of 1310 nm may experience twice as much attenuation as compared to an optical signal having a wavelength of 1550 nm. In FIG. 6, the attenuation of an optical signal having a wavelength of 1310 nm is 0.4 dB/km and the attenuation of an optical signal having a wavelength of 1550 nm is 0.2 dB/km, and 0.4 dB/km divided by 0.2 dB/km is 2. Therefore, if the optical power loss of optical link 13A can be determined for 1310 nm, it may be possible to determine the optical power loss of optical link 13A at the communication signal wavelength of 1550 nm. The above values are exemplary, and other values can be used as well (e.g., determining the optical power loss at 1200 nm and then determining the optical power loss at 1600 nm based on the optical power loss at 1200 nm and the optical power loss ratio between 1600 nm and 1200 nm).

In the techniques described in this disclosure, optical node 12A may be configured to output an optical signal having an out-of-band wavelength (e.g., a first wavelength of 1310 nm) to optical node 12B that processor 36B uses for determining the optical power loss of optical link 13A at the communication signal wavelength (e.g., a second wavelength at 1550 nm). As one example, processor 26A may cause laser 38A to output an optical signal having a wavelength of 1310 nm. WDM 14B outputs the optical signal having the wavelength of 1310 nm to photodiode 16B.

In addition, in some examples, optical node 12A may output information indicating the optical power of the optical signal outputted by laser 28A and EDFA 26A. For instance, if the optical power of the optical signal outputted by laser 28A is 0 dBm, then optical node 12A may output information indicating that the optical power of the optical signal outputted by laser 28A is 0 dBm. Similar procedure is applicable to EDFA 26A. In some examples, processor 36A may cause laser 30A to output the information indicating the optical power of laser 28A and EDFA 26A using OSC signal as a carrier, where the optical signal that laser 30A outputs has a wavelength of 1510 nm (e.g., a fourth wavelength). WDM 14B may receive the optical signal from laser 30A and output the optical signal to photodiode 18B. Processor 36B decodes the information indicating the optical power outputted by laser 28A and EDFA 26A.

Photodiode 16B may output a current proportional to the optical power of optical signal that photodiode 16B receives, which is the optical signal having the wavelength of 1310 nm. Photodiode 18B may output a current that includes information indicating the optical power of the optical signal outputted by laser 28A and EDFA 26A (e.g., the optical power at the instance optical node 12A transmitted the output of laser 28 and EDFA 26A). Based on the current that photodiode 16B outputs, processor 36B determines the optical power of the received optical signal having the wavelength of 1310 nm and based on the current that photodiode 18B outputs, processor 36B determines the optical power of the laser 28A and EDFA 26A. From this information, processor 36B may determine the optical power loss at wavelength 1310 nm of optical link 13A; however, as described in more detail, there may be an error in this measurement that needs correcting in accordance with the techniques described in this disclosure.

Because the optical signal having the out-of-band wavelength (e.g., 1310 nm wavelength) has a wavelength less than that of Raman pumps 38, the gain that Raman amplifier 20B provides may not affect the out-of-band signal. Therefore, Raman amplifier 20B may not affect the optical signal having the out-of-band wavelength that optical node 12B receives. As described in more detail, the inverse may not be true, and the optical signal having the out-of-band wavelength may have an effect on Raman amplifier 20B.

As an example to assist with understanding, assume that based on the current outputted by photodiode 16B, processor 36B determines that the optical power of the received signal having the wavelength of 1310 nm is −26 dBm. Based on the current outputted by photodiode 18B, processor 36B determines that the transmit optical power of the signal having the wavelength of 1310 nm is 0 dBm (e.g., the power at which optical node 12A transmitted the optical signal having the wavelength of 1310 nm).

In this example, processor 36 may determine that the optical power loss of optical link 13A for optical signals having a wavelength of 1310 nm is 26 dB (e.g., 0−−26). As described above with the example of FIG. 6, an optical signal having a wavelength of 1310 nm may attenuate by approximately twice as much as an optical signal having a wavelength of 1550 nm. In this example, processor 36 may determine that the optical signal loss at 1550 nm is 13 dB (26 dB divided by 2). Processor 26 may then set the optical power of the optical signals of Raman pumps 38 so that the gain of Raman amplifier 20B is 13 dB to compensate for the 13 dB loss at the communication signal wavelength of 1550 nm.

FIG. 6 provides one example to determine the power loss ratios for different wavelengths. However, sometimes, a small variation from the attenuation curve shown in FIG. 6 is possible. It is beneficial to measure the attenuation ratio between communication wavelength around 1550 nm and out-of-band wavelength around 1310 nm when the Raman amplifier 20B is initially set up.

Optical node 12A (e.g., via processor 36A) can cause laser 28A and EDFA 26A to output optical signal at certain power level. The output power level of laser 28A and EDFA 26A can be transmitted through laser 30A in the OSC channel to node 12B. At beginning, optical node 12B turns off Raman amplifier 20B. Optical node 12B (e.g., via processor 36B) can measure the receiving power level at out-of-band wavelength using PD 16B and the receiving power level at communication wavelength using the input PD of EDFA 26B. Together with output level of laser 28A and 30A, optical node 12B can determine the optical loss from node 12A to node 12B at the out-of-band wavelength and the communication wavelength. Then the attenuation ratio between out-of-band wavelength and communication wavelength can be determined.

After this, optical node 12B can turn on Raman amplifier 20B for data traffic. Unlike the point loss and span loss which could change over time and cause the variation of Raman gain, the attenuation ratio between out-of-band wavelength and communication wavelength will remain unchanged for fixed optical link 13A. Once measured at the beginning, the ratio can be used as long as optical link 13A remains in place.

The above is merely one example to determine power loss ratios between different wavelengths (e.g., a ratio for 2 between 1550 nm and 1310 nm), and the techniques described in this disclosure are not limited to the above example for determining power loss ratios. To assist with understanding as to the 0.2 dB/km loss of 1550 nm and 0.4 dB/km loss for 1310 nm, FIG. 7 is a graph illustrating optical power loss over distance for the C-band wavelength (e.g., 1550 nm) and the O-band wavelength (e.g., 1310 nm).

Figure 7:
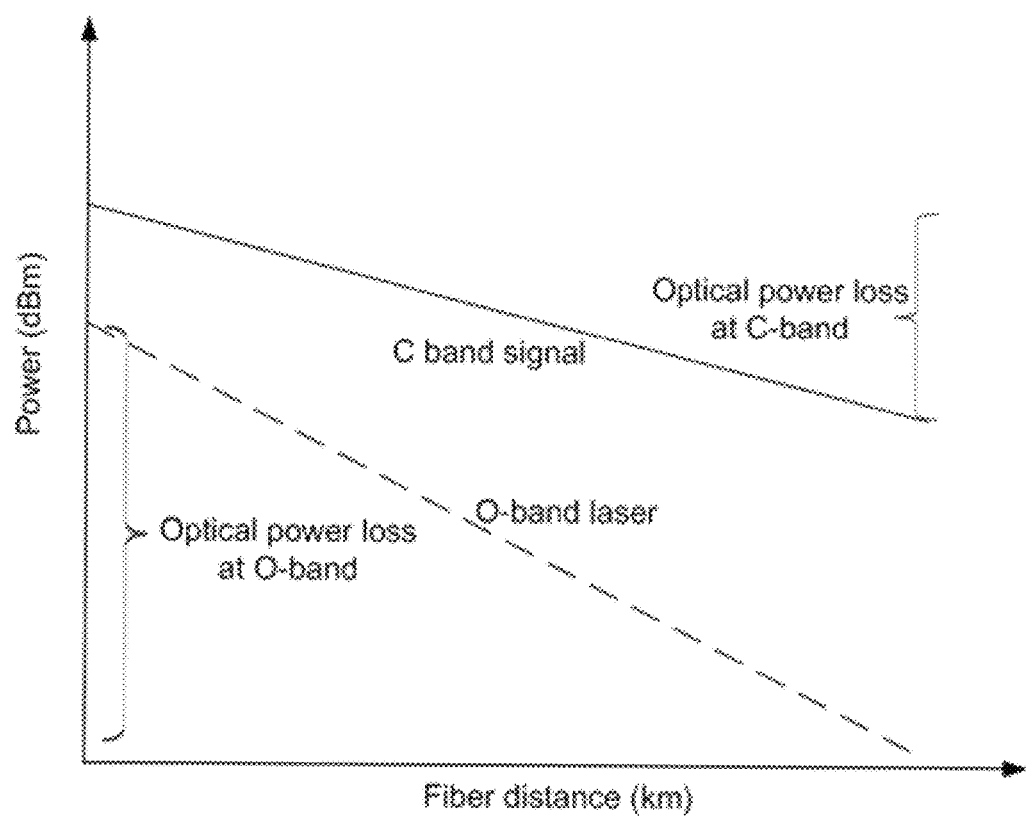
FIG. 7 is a graph illustrating optical power loss over distance for the C-band wavelength and the O-band wavelength.

As illustrated in FIG. 7, optical node 12A may output an optical signal having the C-band wavelength of 1550 nm, and over the distance of optical link 13, the optical power of the optical signal at the C-band wavelength is lost. Similarly, optical node 12A may output an optical signal having the O-band wavelength of 1310 nm, and over the distance of optical link 13, the optical power of the optical signal at the O-band wavelength is lost.

In this example, the initial power of the C-band wavelength signal is greater than the initial power of the O-band wavelength signal. However, as illustrated in FIG. 7, the slope the C-band wavelength signal relative to distance is less than the slope of the O-band wavelength signal relative to distance. This means that for every kilometer that the optical signals travel, the optical signal having the C-band wavelength attenuates less than the optical signal having the O-band wavelength (e.g., the C-band wavelength signal attenuates at 0.2 dB/km while the O-band wavelength signal attenuates at 0.4 dB/km).

In the above example, processor 36B may have determined that the optical loss at 1310 nm is −26 dB based on measured optical signal at 1310 nm and the information indicating the power at which the optical signal having the 1310 nm wavelength was transmitted. Processor 36B may then determine the optical power loss at 1550 nm at 13 dB based on the power loss ratios, as described above (e.g., 26 divided by 2).

However, the determined power loss for the 1550 nm optical signal may be incorrect because there may be an error in the measurement that there is a 26 dB optical power loss on optical link 13A for optical signals having wavelengths of 1310 nm. In particular, the 26 dB optical power loss cannot all be attributed to optical link 13A. Rather, a portion of 26 dB optical power loss is from optical link 13A, and not all of the 26 dB optical power loss is from optical link 13A. Because the 26 dB optical power loss on optical link 13A is an overestimate of the optical power loss caused by optical link 13A, the 13 dB optical power loss on optical link 13A for the communication signal wavelength may also be an overestimate of the actual optical power loss caused by optical link 13A for optical signals having the communication signal wavelength. Therefore, processor 36B may cause Raman amplifier 20B to provide more gain than is really needed because the actual optical power loss of optical link 13A for optical signals having the communication signal wavelength may be less than 13 dB.

The 26 dB optical power loss determination for optical signals having the out-of-band wavelength is incorrect because of the effect of the optical signal having the out-of-band wavelength on Raman amplifier 20B. As shown in FIG. 3, the gain spectrum of Raman amplifier is very wide. When the frequency difference between two lasers are within 40 THz, there is some amount of Raman interaction between two lasers. For example, the frequency difference between 1310 nm out-of-band laser and 1445 nm Raman pump is 21.4 THz, as indicated by the arrow in FIG. 3. In this case, the optical signal having the out-of-band wavelength effectively functions as another Raman pump for Raman amplifier 20B. Some of the optical power of the optical signal having the out-of-band wavelength is used as providing amplification to the optical signal having the wavelength of Raman pumps at 14xx nm. Stated another way, some of the power of the optical signal having the out-of-band wavelength is depleted during the process where the optical signal acting as a Raman pump for the counter-propagating Raman pumps 38 has a small Raman gain.

Because some of the power of the optical signal having the out-of-band wavelength depletes, using only the received optical signal for determining the optical power loss of optical link 13A may result in an overestimation of the optical power loss of optical link 13A. For instance, again, assume that optical power of the optical signal that laser 28A outputs is 0 dBm, and that the optical power of the optical signal that PD 16B receives is −26 dBm. In this case, assume that 2 dB of the optical signal that laser 28A outputs became essentially a Raman pump for Raman amplifier 20B. Therefore, in this example, the optical power loss of optical link 13A is actually only −24 dB and the optical power loss due to Raman amplifier 20B is −2 dB for a total loss of −26 dB in the optical signal that PD 16B receives.

If the effects of the out-of-band optical signal are not taken into account, processor 36B would have determined the optical power loss of optical link 13A to be −13 dB for the communication signal wavelength (e.g., 1550 nm), when it is actually −12 dB for the communication signal wavelength (24 divided by 2). Accordingly, in this example, processor 36B should determine the optical power loss of optical link 13A for the 1310 nm optical signal as −24 dB, and determine the optical power loss of optical link 13A for the 1550 nm optical signal based on the −24 dB measurement, not the −26 dB measurement (e.g., determine the optical power loss of optical link 13A for 1550 nm to be −24 dB divided by 2, and not −26 dB divided by 2).

Figure 8B:
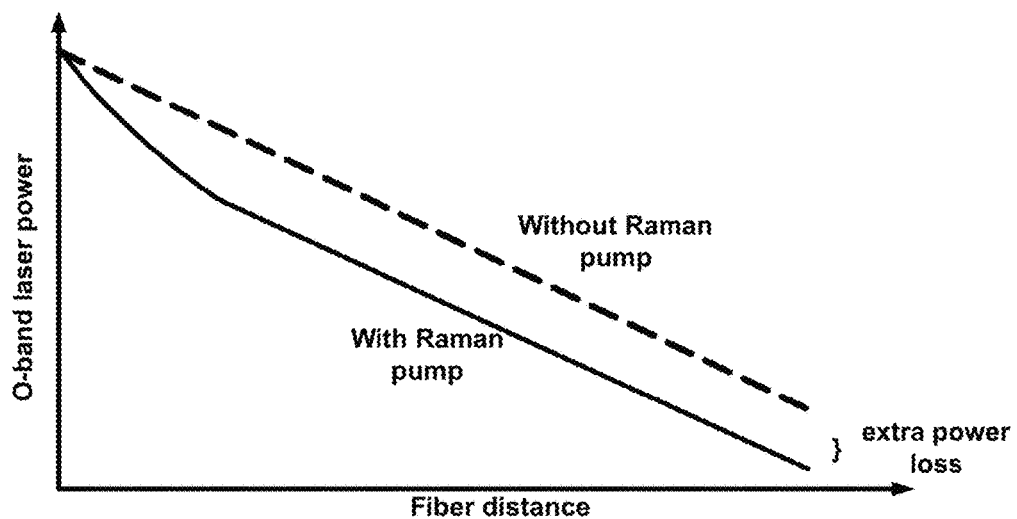
FIG. 8B is a graph illustrating the correction factor for compensating for the power loss in the O-band.
Figure 8A:
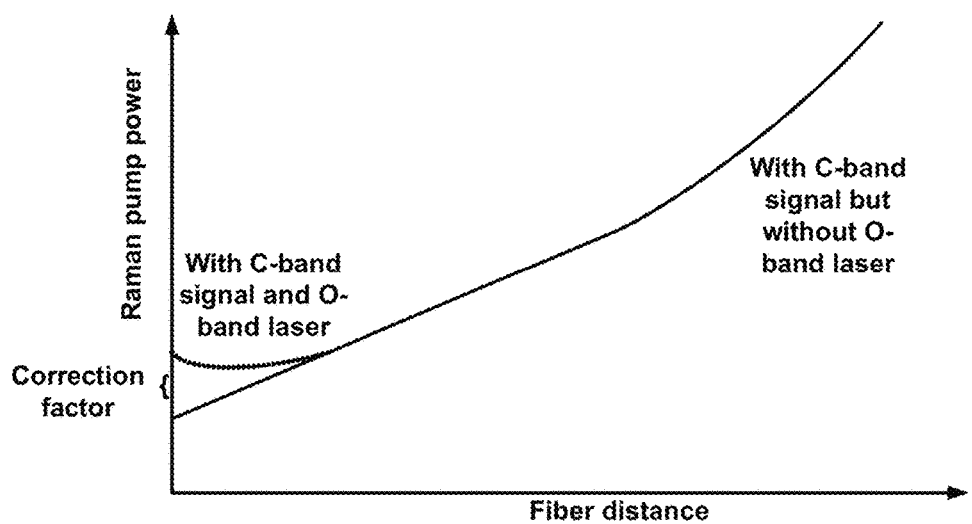
FIG. 8A is a graph illustrating loss of power in the O-band due to Raman pumps.

FIG. 8A is a graph illustrating loss of power in the O-band due to Raman pumps. FIG. As illustrated in FIG. 8A, if Raman amplifier 20B was off or not included in optical node 12B, then the optical power loss of the optical signal having the O-band wavelength (e.g., 1310 nm) as a function of distance is illustrated by the dashed line. If Raman amplifier 20B is on, then some of the optical power of the optical signal having the O-band wavelength depletes, which is why the solid line in FIG. 8A has almost the same slope as the dashed line, but with a fixed offset.

In this case, if processor 36B determined the optical power loss at 1310 nm of optical link 13A based on when Raman amplifier 20B is on, processor 36B may determine that there is more loss at the 1310 nm wavelength then the real amount of loss. For instance, processor 36B may determine that there is a loss of −26 dB at 1310 nm, but the loss due to optical link 13A may really be −24 dB, and the remaining −2 dB may be from the extra power loss (e.g., the offset between the dashed and solid line in FIG. 8A) because the optical signal having the 1310 nm wavelength functions as a Raman pump for Raman amplifier 20B.

In accordance with techniques described in this disclosure, processor 36A determines a correction factor that is indicative of an amount of optical power loss that Raman amplifier 20B in optical node 12B causes in an optical signal having an out-of-band wavelength that is transmitted by optical node 12A and received by second optical node 12B. For instance, processor 36A determines the effect that transmitting the out-of-band optical signal has on Raman amplifier 20B (e.g., how much power of the optical signal that laser 28A outputs is depleted for functioning as a Raman pump for Raman amplifier 20B).

To determine the correction factor, processor 36A relies upon the output of PD 32A. WDM 34A splits the optical signal that pump combiner 22B of Raman amplifier 20B outputs and transmits the optical signal to PD 32A. The amplitude of the current that PD 32A outputs is proportional to the optical power of the optical signal that Raman amplifier 20B outputs. For example, if laser 28A is off, then the current that PD 32A outputs is indicative of the optical power of the optical signal that Raman amplifier 20B outputs using Raman pumps 38. If laser 28A is on, then the current that PD 32A outputs is indicative of the optical power of the optical signal that Raman amplifier 20B outputs using Raman pumps 38 and the contribution from laser 28A.

In this example, PD 32A receives, from Raman amplifier 20B, an optical signal having wavelengths combined from pump combiner 22B when laser 28A is off, and processor 36A determines the amount of current outputted by PD 32A in response to receiving the optical signal from Raman amplifier 20B. PD 32A receives, from Raman amplifier 20B, an optical signal having wavelengths combined from pump combiner 22B when laser 28A is on, and processor 36A determines the amount of current outputted by PD 32A in response to receiving the optical signal from Raman amplifier 20B. Processor 36A determines the difference between these two currents to determine the correction factor. In some examples, a homodyne detection scheme with a beating LO (local oscillator) signal may be used to improve accuracy.

For example, the difference between the currents that PD 32A outputs when laser 28A is on and when laser 28A is off is indicative of the effect that laser 28A has on Raman amplifier 20B. For example, if the amplitude of the current that PD 32A outputs when laser 28A is on is 10% greater than the amplitude of the current that PD 32A outputs when laser 28A is off, then approximately 10% of the optical power of the optical signal that laser 28A outputs is depleted to function as a Raman pump. In this example, the correction factor is 10%. The procedure above is equivalent to measuring the on/off gain of O-band laser on Raman pumps. By turning off laser 28A, one measures the off-power. By turning on laser 28A, one measures the on-power.

FIG. 8B is a graph illustrating the correction factor for compensating for the power loss in the O-band. As illustrated in FIG. 8B, the dashed portion illustrates the difference in the Raman pump power for when the O-band laser (laser 28A) is on and when the O-band laser (laser 28A) is off. The difference in the Raman pump power is due to the depletion of the optical signal having the O-band wavelength, and indicative of the correction factor that is to be applied to more accurately determine the optical power loss of optical link 13A at the O-band wavelength.

In one example, processor 36A may cause laser 30A, which transmits optical signals having the OSC signal wavelength, to transmit information indicating the correction factor and the optical power of laser 28A at the instance that laser 28A outputs the optical signal (e.g., before any attenuation). In some examples, the optical power of laser 28A may be pre-stored in a memory coupled to processor 36B, and in such examples, processor 36A may not cause laser 30A to transmit information indicating the optical power of laser 28A. In this example, processor 36B may determine the optical power loss on optical link 13A having the out-of-band wavelength, as described above. For example, processor 36B may subtract the measured optical power of the optical signal having the out-of-band wavelength from the optical power of laser 28A at the instance of transmission (e.g., subtract −26 dBm from 0 dBm for a loss of 26 dB).

In this case, processor 36B may further apply the correction factor to account for the depletion of the optical signal having the out-of-band wavelength. For example, processor 36B may adjust the determined optical power loss based on the correction factor. For instance, processor 36 may subtract out the 10% of the determined loss because that 10% was not from span or point loss of optical link 13A, but was rather from the depletion of the optical signal having the out-of-band wavelength for Raman amplification. The result is a more accurate estimation of the optical power loss of optical link 13A of optical signals having the out-of-band wavelength.

Processor 36B uses this adjusted optical power loss to determine the optical power loss of optical link 13A for optical signals having the communication signal wavelength. For instance, processor 36B may use a look-up table that includes the information illustrated in FIG. 6 or 7 to determine the optical power loss ratio between the two wavelengths (e.g., out-of-band wavelength and the communication signal wavelength), may be pre-programmed with ratio, or may determine the ratio at initial setup as described above. With a determination of optical power loss of optical signals having the communication signal wavelength, and the information of EDFA 26A output from the OSC channel, processor 36B can determine the receiving optical power at communication wavelength if there is no Raman gain.

For example, the corrected optical loss at 1550 nm is −12 dB, the output from EDFA 26A is 10 dBm, the receiving optical power at communication wavelength without any Raman gain (off-power) is −2 dBm. EDFA 26B will have an input photo diode 37B, whose output current is proportional to the receiving optical power at communication wavelength with Raman gain. By comparing the power with and without Raman gain at communication wavelength, processor 36B may determine whether the gain of Raman amplifier 20B is too low to compensate for the loss or too high resulting in overcompensation. Processor 36B sets the optical power of Raman pumps 38 according to the determination (e.g., increase the optical power if more amplification is needed, decreases the optical power if less amplification is needed, or no change if amplification is correct).

In some examples, processor 36A need not necessarily cause laser 30A to transmit information indicating the correction factor. Rather, processor 36A may use the correction factor to adjust the value of the optical power of laser 28A (or possibly the output of EDFA 26A). For example, processor 36B determines the optical power loss of optical link 13A at the out-of-band wavelength based on the measured optical power, the optical power at transmission, and the correction factor. In some examples, processor 36A may adjust the value indicating the optical power at transmission of laser 28A based on the correction factor, and transmit the adjusted optical power as the actual optical power of laser 28A. In this case, processor 36B may determine the optical power loss of the optical signal having the out-of-band wavelength as described above, but would not need to take any further corrective action because the optical power of laser 28A was adjusted to account for the correction factor. Processor 36B may perform a similar procedure based on the output power of EDFA 26A or a combination of EDFA 26A and laser 28A.

As an example, if processor 36A determines a correction factor of 10%, processor 36A may use the correction factor to determine an adjustment of the 0 dBm optical power of laser 28A. Processor 36A may then cause laser 30A to transmit information indicating that the optical power of laser 28A is the adjusted optical power (and not the actual optical power of 0 dBm). Processor 36B would then subtract the optical power of the received optical signal −26 dBm from the adjusted optical power to determine the optical power loss of optical link 13A for optical signals having the out-of-band wavelength (e.g., 1310 nm), and use the resulting value to determine the optical power loss of optical signals having the communication signal wavelength.

Accordingly, processor 36A of optical node 12A may be configured to determine a correction factor that is indicative of an amount of optical power loss that Raman amplifier 20B in a following optical node (e.g., optical node 12B) causes in an optical signal having an out-of-band wavelength (e.g., 1310 nm) that is transmitted by laser 28A of optical node 12A and received by PD 16B of optical node 12B. Processor 36A causes laser 30A to transmit information (e.g., as an OSC signal), based on the determined correction factor, that is to be used for determining a gain of Raman amplifier 20B. Processor 36A causes EDFA 26A to transmit the communication signal (e.g., an optical signal having a communication signal wavelength).

As one example, to transmit information based on the determined correction factor, processor 36A causes laser 30A to transmit information indicative of the correction. As another example, processor 36A determines the optical power outputted by laser 28A, and determines an adjusted optical power based on the determined optical power outputted by laser 28A and the determined correction factor. In this example, to transmit information based on the determined correction factor, processor 36A causes laser 30A to transmit information indicative of the adjusted optical power.

From the perspective of optical node 12B, optical node 12B includes Raman amplifier 20B that is configured to amplify an optical signal having a communication signal wavelength (e.g., the communication signal that EDFA 26A or optical node 12A, more generally, outputs). Processor 36B determines an amount of current generated by PD 16B, where PD 16B receives from a previous optical node (e.g., optical node 12A) an optical signal having an out-of-band wavelength. Processor 36B may also receive information based on a correction factor, the correction factor is indicative of an amount of optical power loss that Raman amplifier 20B causes in the optical signal having the out-of-band wavelength that is transmitted by the previous optical node. Processor 36 determines the Raman amplifier gain for optical signals having the communication signal wavelength based on the determined amount of current generated by PD 16B and the received information, and sets the Raman amplifier gain of Raman amplifier 20B for Raman amplifier 20B to amplify the optical signal having the communication signal wavelength based on the Raman amplifier gain.

To determine the Raman amplifier gain based on the amount of current generated by PD 16B, processor 36B may determine a first optical power in optical link 13A for optical signals having the out-of-band wavelength based on the determined amount of current generated by PD 16B and the received information based on the correction factor, and determine optical loss from node 12A to 12B at the out-of-band wavelength. Based on the ratio of attenuation coefficient as described above with respect to FIG. 6 or calibrated ratio when Raman pump is initialized, processor 36B can further determine the optical loss from node 12A to 12B at the communication wavelength. Processor 36B also receive the information of output power level from EDFA 26A at the communication wavelength. Then, processor 36B determines a second optical power (the off-power) in optical link 13A for optical signals having the communication signal assuming the Raman amplifier is turned off. EDFA 26B has an input PD 37B which can determine the third optical power (the on-power) in optical link 13A for optical signals having the communication wavelength with Raman amplifier on. Processor 36B determines the Raman amplifier gain based on the difference between the third optical power (Raman gain-on) and the second optical power (Raman gain-off). Processor 36B then compares the measured Raman gain against the gain target of Raman amplifier, and adjusts the pump power of Raman amplifier to meet the gain target. In some cases, the gain target is roughly the second optical power loss (e.g., the span or point loss of optical link 13), but in some other cases, the gain target could be different from the second optical power loss.

As one example, processor 36B receives the information of the correction factor (e.g., a correction factor value of 10%). With the received correction factor, processor 36B adjusts the measured optical power loss for the out-of-band wavelength, and determines the optical loss for the communication wavelength based on this adjusted optical power loss.

As another example, processor 36B may receive information generated from the correction factor, where the information is indicative of any amount of optical power outputted by laser 28A in the previous optical node (e.g., optical node 12A). For instance, this information of the optical power outputted by laser 28A may not be the actual power outputted by laser 28A, but rather an adjusted optical power that is adjusted based on the correction factor. In this example, processor 36B determines the optical power loss for the out-of-band wavelength and without any further compensation of the determined optical power loss, determines the optical power loss for the communication signal wavelength, and determines the Raman amplifier gain based on the determined optical power loss for the communication signal wavelength, in a similar fashion as described above.

In some other techniques, rather than determining the gain of Raman amplifier 20B in real time, the other techniques set the gain of Raman amplifier 20B to a constant. However, such techniques may not function well because slight changes in the loss may have relatively large effects on the Raman amplifier gain. For instance, 0.5 dB point loss change may lead to 1.5 dB Raman amplifier gain change. If the gain of Raman amplifier 20B were kept constant, then if there is a change in the optical power loss of the optical signal outputted by optical node 20A, Raman amplifier 20B may not properly compensate for the loss. Accordingly, real-time monitoring of the gain of Raman amplifier 20B may be useful to ensure that the Raman amplifier 20B is amplifying the received communication signal by the correct amount to compensate for the optical power loss.

Some other techniques for real-time monitoring of the gain of Raman amplifier 20B rely on amplified spontaneous emission (ASE) to determine the Raman amplifier gain. These techniques measure the ASE at an out-of-band wavelength (e.g., at a wavelength that is not of the communication signal). Because ASE power is proportional to Raman gain, processor 36B may then determine Raman gain based on a look-up which describes the relationship between Raman gain and ASE. There may be limits to using ASE for determining the gain of Raman amplifier 20B. For example, the out-of-communication-band ASE power is generally not high enough for controller 36B to determine the optical power loss accurately.

This disclosure describes example ways to determine the Raman amplifier gain of Raman amplifier 20B in real-time where processor 36B determines the optical power loss on optical link 13A for an out-of-band signal (e.g., a signal having a wavelength different than that of communication signal) and uses this optical power loss measurement to determine the optical power loss at the communication signal wavelength. In addition, processor 36A determines a correction factor indicative of the effects of the out-of-band optical signal on Raman amplifier 20B so that the optical power loss of optical link 13A for the out-of-band signal is more accurate, resulting in a more accurate determination of the optical power loss of optical link 13A at the communication signal wavelength and more accurate determination of the optical power of Raman pumps 38.

The examples described in this disclosure may also provide advantages for low-latency automatic laser shutdown. In case there is a cut in optical link 13A, it may be mandatory to turn off both Raman amplifier 20B in optical node 12B and the output of communication signal that optical node 12A outputs. In some other techniques, processor 36B turns off Raman amplifier 20B when there is no OSC signal (e.g., no current from PD 18B). However, in these other techniques, it may be difficult to convey to optical node 12A that there is a cut in optical link 13A and to stop transmission of the communication signal.

In some examples, processor 36A may utilize the output of PD 32A to determine whether there is a cut in optical link 13A. For instance, PD 32A outputs a current based on the optical signal that Raman amplifier 20B outputs. If there is no current flowing from PD 32A, then there is a cut in optical link 13A, and processor 32A may cause EDFA 26A or optical node 12A, more generally, to turn off transmission of the communication signal. In this way, the usage of PD 32A to determine a cut in optical link 13A may improve response time for laser shutdown and reduce complexity in recovery (e.g., when PD 32A outputs current again, optical link 13A is fixed and processor 32A can allow transmission of the communication signal). In this way, processor 36A may determine that an optical signal having a 14xx nm wavelength is not being received from Raman amplifier 20B, and in response to determining that the optical signal having the 14xx nm wavelength is not being received from Raman amplifier 20B, disable the transmission of the optical communication signal.

Figure 9:
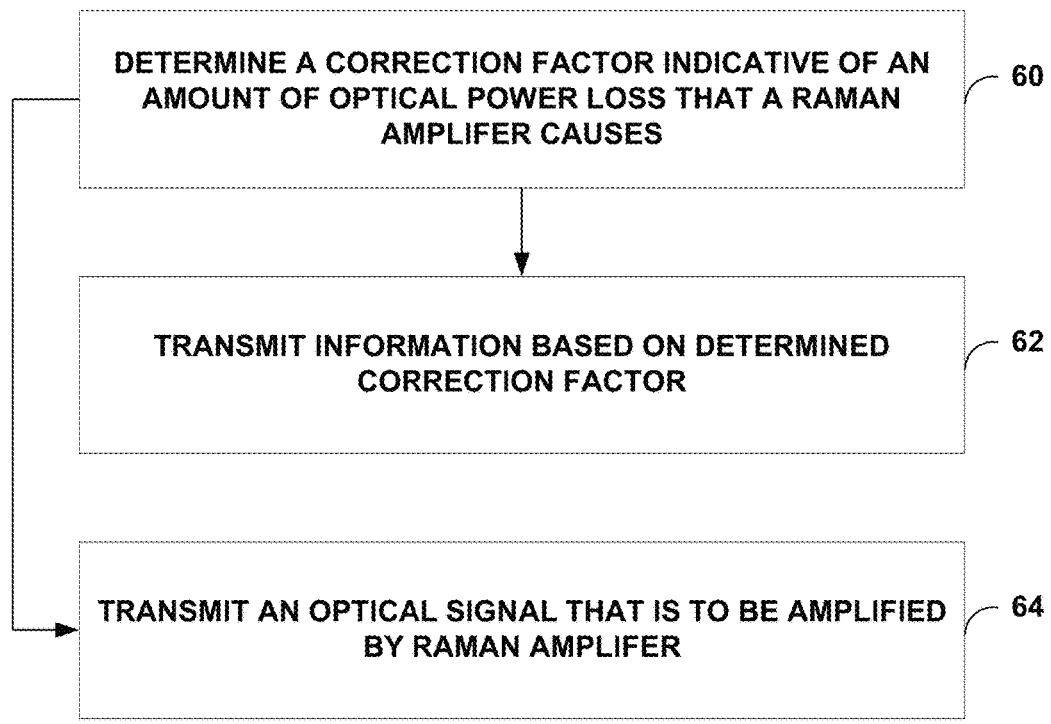
FIG. 9 is a flowchart illustrating an example technique in accordance with one or more aspects of this disclosure.

FIG. 9 is a flowchart illustrating an example technique in accordance with one or more aspects of this disclosure. The example of FIG. 9 is described with respect to optical node 12A.

In the example illustrated in FIG. 9, optical node 12A may determine a correction factor indicative of an amount of optical power loss that Raman amplifier 20B, which is in a following optical node (e.g., optical node 12B), causes in an optical signal having a first wavelength (e.g., out-of-band wavelength or 1310 nm) that is transmitted by optical node 12A and received by optical node 12B (60). Example techniques for determining the correction factor is described in more detail above and with respect to FIG. 10.

Optical node 12A transmits information based on the determined correction factor to optical node 12B, where the information is to be used for determining a gain of Raman amplifier 20B (62). As one example, processor 36A causes laser 30A to transmit the information indicative of the correction factor (e.g., directly transmits the correction factor). As another example, processor 36A determines an optical power outputted by laser 28A that is outputting the optical signal having the first wavelength, and determines an adjusted optical signal based on the determined optical power outputted by laser 28A and the determined correction factor. In this example, to transmit information based on the determined correction factor, processor 36A causes laser 30A to transmit information indicative of the adjusted optical power. Laser 30A may be configured to transmit information via an optical supervisory channel (OSC) at a wavelength of 1510 nm.

Optical node 12A transmits an optical signal having a second wavelength (e.g., the communication signal wavelength or 1550 nm) that is to be amplified by Raman amplifier 20B. For instance, the output of EDFA 26A is the optical communication signal that carries the data that is to be communicated (e.g., from a server to a computer). The wavelength of the communication signal may be 1550 nm as one example. The wavelength of the out-of-band signal (e.g., 1310) may be less than the wavelength of the communication signal (e.g., 1550 nm) and less than the wavelength of Raman pumps 38 (e.g., 14xx nm).

Figure 10:
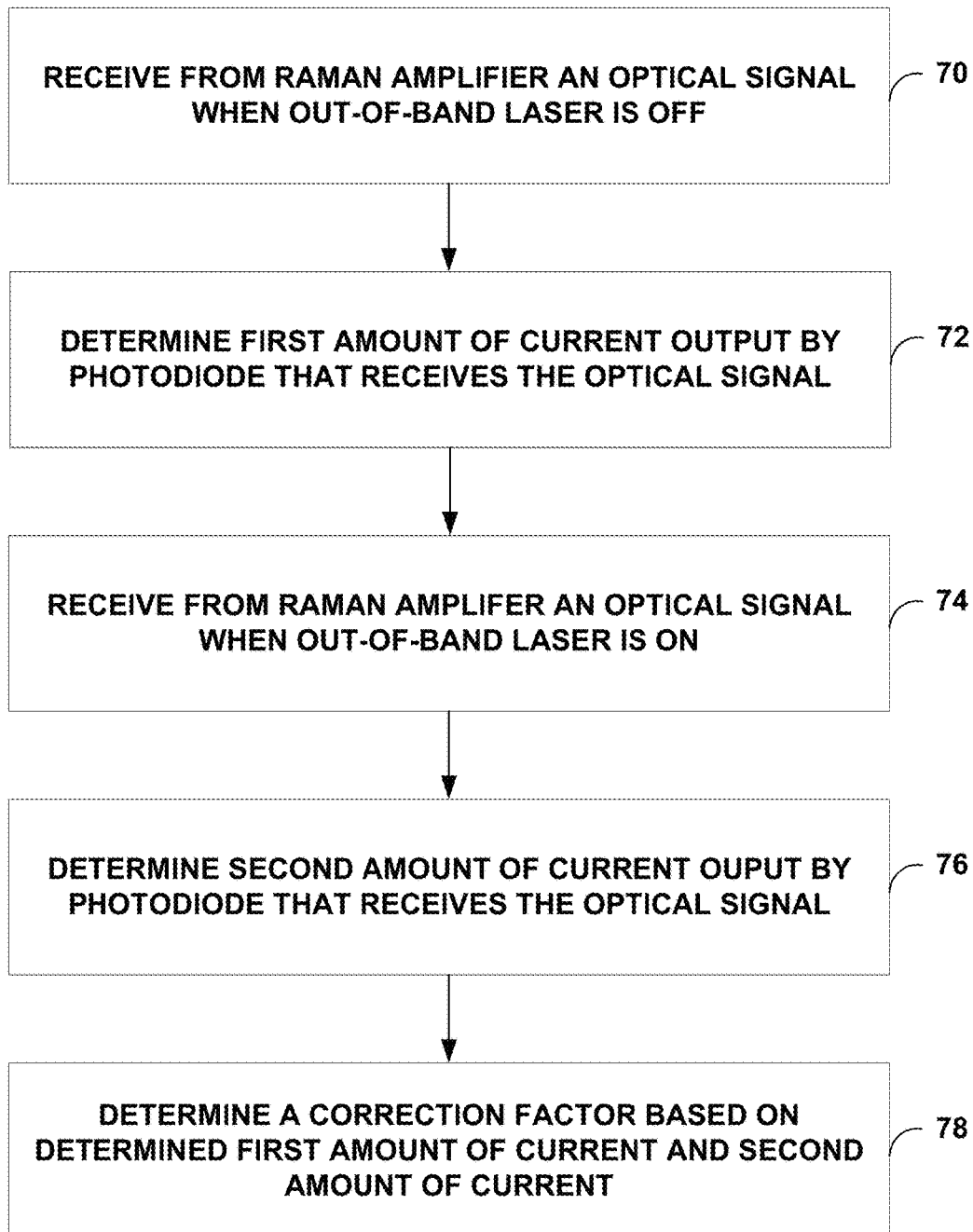
FIG. 10 is a flowchart illustrating another example technique in accordance with one or more aspects of this disclosure.

FIG. 10 is a flowchart illustrating another example technique in accordance with one or more aspects of this disclosure. The example of FIG. 10 is described with respect to optical node 12A. As noted above, FIG. 10 describes an example manner of determining the correction factor that is indicative of an amount of optical power loss that Raman amplifier 20B, which is in a following optical node (e.g., optical node 12B), causes in an optical signal having a first wavelength (e.g., out-of-band wavelength or 1310 nm) that is transmitted by optical node 12A and received by optical node 12B.

PD 32A receives, from Raman amplifier 20B, an optical signal having a third wavelength (e.g., Raman pump at 14xx nm) (e.g., from the output of pump combiner 22B) when processor 36A turns off laser 28A (70). Processor 36A determines a first amount of current outputted by PD 32A in response to receiving the optical signal having the third wavelength (e.g., Raman pump at 14xx nm) when laser 28A is off (72).

PD 32A receives, from Raman amplifier 20B, the optical signal having the third wavelength (e.g., from the output of pump combiner 22B, at 14xx nm) when processor 36A turns on laser 28A (74). Processor 36A determines a first amount of current outputted by PD 32A in response to receiving the optical signal having the third wavelength (at 14xx nm) when laser 28A is on (76).

Processor 36A determines the correction factor based on the determined first amount of current and the determined second amount of current (78). For example, the difference between the first amount of current and the second amount of current is indicative of the amount of power from laser 28A that is depleted to function as a Raman pump. As described above, processor 36A may then cause laser 30A to transmit information based on the determined correction factor (e.g., either the correction factor itself or an optical power that is adjusted based on the correction factor).

Figure 11:
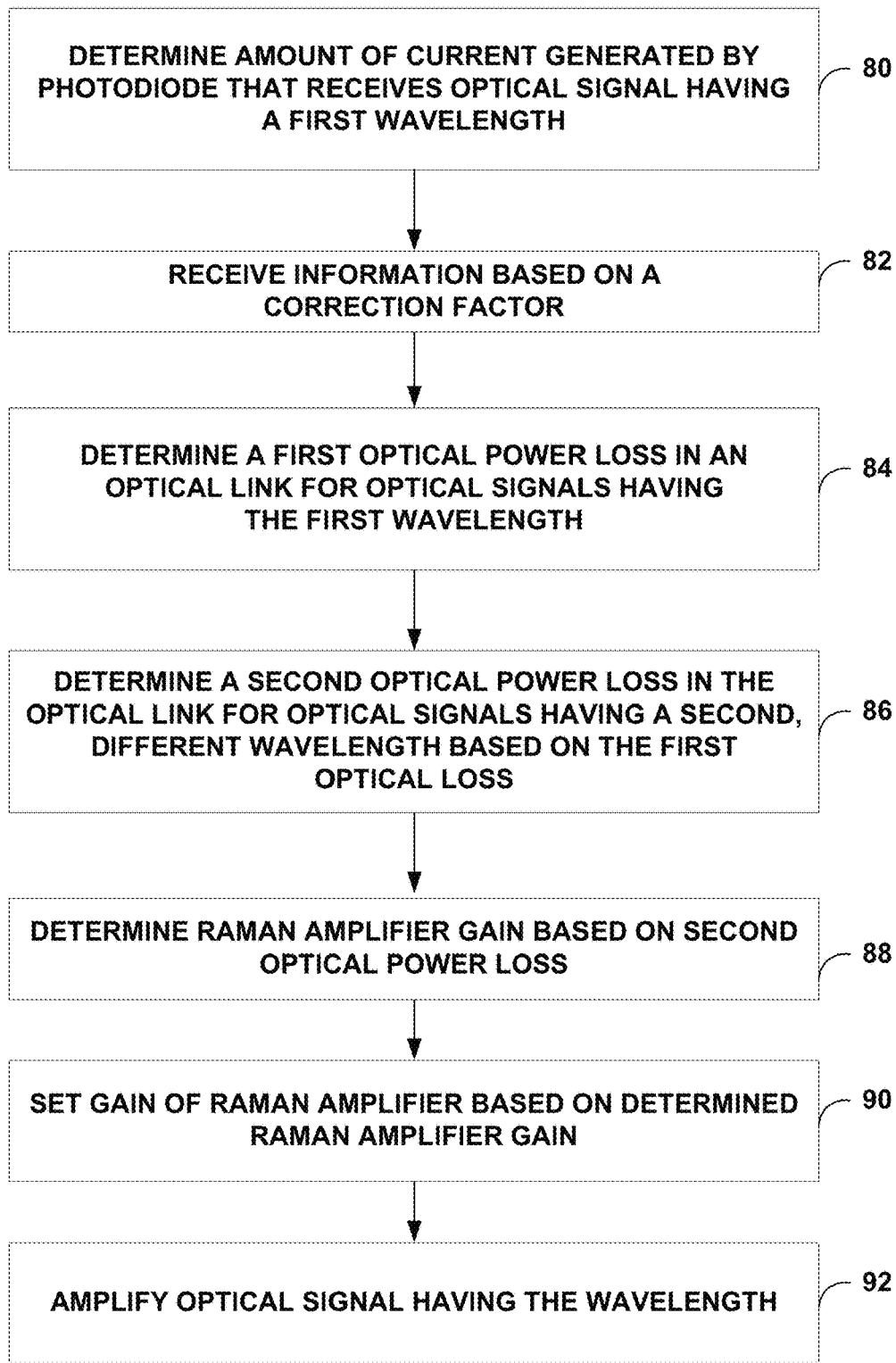
FIG. 11 is a flowchart illustrating another example technique in accordance with one or more aspects of this disclosure.

FIG. 11 is a flowchart illustrating another example technique in accordance with one or more aspects of this disclosure. The example of FIG. 11 is described with respect to optical node 12B. As described above, optical node 12B includes Raman amplifier 20B that is configured to amplify an optical signal having a second wavelength (e.g., communication signal wavelength of 1550 nm).

Processor 36B determines an amount of current generated by photodiode 16B that receives from a previous optical node (e.g., optical node 12A) an optical signal having a first wavelength (e.g., out-of-band wavelength of 1310 nm) (80). Processor 36B also receives information based on a correction factor, where the correction factor is indicative of an amount of optical power loss that Raman amplifier 20B causes in the optical signal having the first wavelength that is transmitted by previous optical node 12A (82).

As one example, to receive information based on the correction factor, processor 36B receives the information of the correction factor. As another example, to receive information based on the correction factor, processor 36B receives information generated from the correction factor, the information is indicative of an amount of optical power outputted by laser 28 in optical node 12A, but this information indicative of the optical power outputted by laser 28 may not be the actual amount of optical power that laser 28A outputs. Rather, the actual value of optical power laser 28A outputs has been adjusted based on the correction factor.

Processor 36B determines a first optical power loss in optical link 13A for optical signals having the first wavelength (e.g., out-of-band wavelength of 1310 nm) (84). For example, processor 36B determines the amount of current received by PD 16B and determines the optical power of laser 28A, based on the amount of current receive by PD 16B and the optical power of laser 28A. Processor 36B then adjusts the optical power loss value based on the correction factor, and determines a first optical power loss in optical link 13A for optical signals having the first wavelength (e.g., out-of-band wavelength of 1310 nm) as the adjusted optical power loss value. In another example, processor 36B determines the amount of current received by PD 16B and determines the optical power of laser 28A, but in this example, the optical power of laser 28A that processor 36B determines has been adjusted based on the correction factor. In this example, processor 36B determines the first optical power loss in optical link 13A for optical signals having the first wavelength (e.g., out-of-band wavelength of 1310 nm) as the determined optical power loss.

In FIG. 11, processor 36B determines a second optical power loss in optical link 13A for optical signals having the second wavelength (e.g., communication signal wavelength of 1550 nm) based on the determined first optical power loss (86). For example, as described with respect to FIG. 6, the ratio between optical power loss for one wavelength and the optical power loss for another wavelength can be determined with a look-up table that stores the information of FIG. 6 or the ratio can be pre-programmed or retrieved by processor 36B. A more accurate but more complicated approach is to calibrate the ratio in the module initialization. Processor 36B may utilize this ratio to determine the second optical power loss based on the first optical power loss (e.g., multiple or divide the first optical power loss by the ratio to determine the second optical power loss).

Processor 36B determines the Raman amplifier gain for Raman amplifier 20B based on the second optical power loss, EDFA 26A output power, and EDFA 26B input power (88). For instance, if processor 36B determines that the Raman gain for optical signals having the second wavelength (e.g., communication signal wavelength) is below/above the target then processor 36B may increase/decrease the optical power of Raman pumps 38 to meet the gain target of Raman amplifier 20B. Processor 36B sets the gain of Raman amplifier 20B based on the determined Raman amplifier gain to amplify the optical signal having the second wavelength (90). Raman amplifier 20B then amplifies the optical signals having the second wavelength (92).

The techniques of this disclosure may be implemented in a wide variety of devices or apparatuses, including linecards, routers, optical interfaces, wireless devices, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units.

Various examples have been described. These and other examples are within the scope of the following claims.

What is claimed is:

1. An optical node comprising:
   a Raman amplifier configured to amplify an optical signal having a second wavelength;
   a photodiode; and
   a processor configured to:
      determine an amount of current generated by the photodiode that receives, from a previous optical node, an optical signal having a first wavelength;
      receive information based on a correction factor, the correction factor is indicative of an amount of optical power loss that the Raman amplifier causes in the optical signal having the first wavelength that is transmitted by the previous optical node;
      determine the Raman amplifier gain for optical signals having the second wavelength based on the determined amount of current generated by the photodiode and the received information; and
      set the Raman amplifier gain of the Raman amplifier for the Raman amplifier to amplify the optical signal having the second wavelength.

2. The optical node of claim 1, wherein the processor is configured to:
   determine a first optical power loss in an optical link for optical signals having the first wavelength based on the determined amount of current generated by the photodiode and the received information based on the correction factor; and
   determine a second optical power loss in the optical link for optical signals having the second wavelength based on the determined first optical power loss,
   wherein the processor is configured to determine the Raman amplifier gain of the Raman amplifier based on the determined second optical power loss, transmitted optical power from previous node at the second wavelength, and the received optical power at the current node at the second wavelength.

3. The optical node of claim 1, wherein to receive information based on the correction factor, the processor is configured to receive information of the correction factor.

4. The optical node of claim 1, wherein to receive information based on the correction actor, the processor is configured to receive information generated from the correction factor, the information is indicative of an amount of optical power outputted by a laser in the previous optical node that outputs optical signal having the first wavelength and optical signal having the second wavelength.

5. The optical node of claim 1, wherein the processor is configured to calibrate the Raman amplifier at an initialization of the Raman amplifier to determine an optical power loss ratio between optical signals having the first wavelength and optical signals having the second wavelength, and wherein the processor is configured to determine the Raman amplifier gain based on the determined amount of current generated by the photodiode, the received information, and the optical power loss ratio.

6. A method comprising:
   determining, with an optical node, an amount of current generated by a photodiode that receives an optical signal having a first wavelength that is transmitted by a previous optical node;
   receiving, with the optical node, information based on a correction factor, the correction factor is indicative of an amount of optical power loss that a Raman amplifier causes in the optical signal having the first wavelength that is transmitted by the previous optical node;
   determining, with the optical node, a Raman amplifier gain of a Raman amplifier for optical signals having a second wavelength based on the determined amount of current generated by the photodiode and the received information;
   setting, with the optical node, the Raman amplifier gain of the Raman amplifier based on the determined Raman amplifier gain; and
   amplifying, with the optical node, the optical signals having the second wavelength with the Raman amplifier.

7. The method of claim 6, further comprising:
   determining a first optical power loss in an optical link for optical signals having the first wavelength based on the determined amount of current generated by the photodiode and the received information based on the correction factor; and
   determine a second optical power loss in the optical link for optical signals having the second wavelength based on the determined first optical power loss,
   wherein determining the Raman amplifier gain of the Raman amplifier comprises determining the Raman amplifier gain of the Raman amplifier based on the determined second optical power loss.

8. The method of claim 6, wherein receiving information based on the correction factor comprises receiving information of the correction factor.

9. The method of claim 6, wherein receiving information based on the correction actor comprises receiving information generated from the correction factor, the information is indicative of an amount of optical power outputted by a laser in the previous optical node that outputs optical signal having the first wavelength.

10. The method of claim 6, further comprising:
    calibrating the Raman amplifier at an initialization of the Raman amplifier to determine an optical power loss ratio between optical signals having the first wavelength and optical signals having the second wavelength,
    wherein the determining the Raman amplifier gain comprises determining the Raman amplifier gain based on the determined amount of current generated by the photodiode, the received information, and the optical power loss ratio.

* * * * *